(12) United States Patent
Palamadai et al.

(10) Patent No.: US 12,744,743 B2
(45) Date of Patent: Sep. 22, 2026

(54) LOW-COST ENERGY-EFFICIENT NETWORK-MANAGED AND DEVICE-MANAGED CONTINUOUS CONNECTIVITY

(71) Applicant: AT&T Intellectual Property I, L.P., Atlanta, GA (US)

(72) Inventors: Rashmi Palamadai, Naperville, IL (US); Yupeng Jia, South Pasadena, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 107 days.

(21) Appl. No.: 18/952,346

(22) Filed: Nov. 19, 2024

(65) Prior Publication Data

US 2026/0142931 A1 May 21, 2026

(51) Int. Cl.

*H04L 47/74* (2022.01)
*H04L 45/00* (2022.01)
*H04L 47/726* (2022.01)

(52) U.S. Cl.

CPC ............ *H04L 47/746* (2013.01); *H04L 45/22* (2013.01); *H04L 47/728* (2013.01); *H04L 47/745* (2013.01)

(58) Field of Classification Search

None

See application file for complete search history.

(56) References Cited

U.S. PATENT DOCUMENTS 9,838,912 B1 * 12/2017 Pawar ............. H04W 36/00224
10,834,574 B1 * 11/2020 Sikes .................... H04L 67/565
10,887,226 B2 * 1/2021 Means .................. H04L 45/586
2002/0172203 A1 * 11/2002 Ji .......................... G06F 16/902 370/395.31
2005/0188106 A1 * 8/2005 Pirbhai .................. H04L 45/54 709/238
2011/0110370 A1 * 5/2011 Moreno .................. H04L 45/04 370/392
2013/0309991 A1 * 11/2013 Shaw .................... H04W 76/36 370/328

(Continued)

FOREIGN PATENT DOCUMENTS

WO WO-2026030992 A1 * 2/2026 ............. H04L 47/28

*Primary Examiner* — Phyllis A Book

(74) *Attorney, Agent, or Firm* — Guntin & Gust, PLC; Andrew Gust

(57) ABSTRACT

Low-cost energy-efficient network-managed and device-managed continuous connectivity can include establishing, with a gateway, wireless communications, the gateway communicating via a connection with a fiber network. The connection with the fiber network can be monitored to determine if the connection with the fiber network has been lost by the gateway, and if a determination is made that the connection with the fiber network has been lost by the gateway, a cellular connection with a cellular network can be activated at a fallback device and communications from the gateway to the cellular network can be relayed through the fallback device. The connection with the fiber network can be monitored to determine if the connection with the fiber network has been reestablished by the gateway. If a determination is made that the connection with the fiber network has been reestablished by the gateway, the cellular connection can be terminated.

20 Claims, 8 Drawing Sheets

(56) References Cited

U.S. PATENT DOCUMENTS

| | | | | |
|---|---|---|---|---|
| 2014/0064156 | A1* | 3/2014 | Paladugu | H04W 36/00226 370/259 |
| 2014/0177640 | A1* | 6/2014 | Yang | H04L 45/033 370/401 |
| 2015/0092772 | A1* | 4/2015 | Copeland | H04L 45/745 370/389 |
| 2015/0119034 | A1* | 4/2015 | Li | H04W 60/04 455/435.2 |
| 2016/0198514 | A1* | 7/2016 | Wang | H04W 52/0238 370/311 |
| 2017/0012942 | A1* | 1/2017 | Wittenschlaeger | H04L 63/0281 |
| 2017/0026244 | A1* | 1/2017 | Kamath | H04L 41/40 |
| 2017/0195210 | A1* | 7/2017 | Jacob | H04L 45/04 |
| 2018/0278519 | A1* | 9/2018 | Means | H04L 12/66 |
| 2018/0288678 | A1* | 10/2018 | Lee | H04W 48/04 |
| 2019/0190823 | A1* | 6/2019 | Means | H04L 12/66 |
| 2020/0036578 | A1* | 1/2020 | Gupta | H04L 67/60 |
| 2021/0021646 | A1* | 1/2021 | Chiang | H04L 65/80 |
| 2021/0136559 | A1* | 5/2021 | Chastain | H04W 4/50 |
| 2021/0153087 | A1* | 5/2021 | Lee | H04W 36/08 |
| 2021/0328918 | A1* | 10/2021 | Yang | H04L 12/4633 |
| 2021/0328922 | A1* | 10/2021 | Yang | H04L 45/586 |
| 2022/0123961 | A1* | 4/2022 | Mukundan | H04L 1/004 |
| 2022/0141108 | A1* | 5/2022 | Gilson | H04L 43/0829 |
| 2022/0264701 | A1* | 8/2022 | Dowlatkhah | H04W 88/06 |
| 2023/0083537 | A1* | 3/2023 | Cui | H04W 40/36 370/329 |
| 2025/0047594 | A1* | 2/2025 | Manohar | H04L 45/42 |
| 2025/0063481 | A1* | 2/2025 | Chin | H04W 48/16 |
| 2026/0058902 | A1* | 2/2026 | Wen | H04L 45/04 |

* cited by examiner

100
Share Command
138
Cellular Network
130
Network Monitor
132
Network Data
134
Server Computer
Connectivity Service
114
116
Network
104
Fallback Command
136
Fiber Network
112
Connected Environment
120
Fallback Device
FBD Controller
124
FBD Power Supply
126
FBD Network Adapter
128
122
Gateway
GW Controller
106
GW Power Supply
108
GW Network Adapter
110
102
User Device
118
B
A

LOW-COST ENERGY-EFFICIENT NETWORK-MANAGED AND DEVICE-MANAGED CONTINUOUS CONNECTIVITY

BACKGROUND

Customers can face disrupted service due to natural disasters, network issues and network equipment type issues outside the residence. While some devices may use backup communication bands to provide connection redundancy, such connections are often unneeded and therefore network resources may be wasted and customer satisfaction may suffer (e.g., costs may be high to maintain a backup connection). Furthermore, such redundant communication channels may be managed by customers as opposed to carriers, so knowing when to use or not to use the redundant channels may be difficult.

SUMMARY

The present disclosure is directed to low-cost energy-efficient network-managed and device-managed continuous connectivity. A home, office, or other gateway device ("gateway") can be located at a location (e.g., a home, office, vehicle, or the like) to create a connected environment. The connected environment can correspond to a home, a business, a vehicle, or other location or entity at which one or more devices (e.g., a user device, Internet-of-things devices, computers, home alarm systems, combinations thereof, or the like) connect to the Internet and/or other networks via the gateway. According to various embodiments, the gateway can connect to a fiber network, though other network connections (e.g., fixed satellite, wireless, and the like) are possible and are contemplated.

The gateway can include a stackable fallback device, which can be connected to the gateway directly and/or wirelessly. The fallback device can include a fallback device network adapter that can include a cellular networking device (e.g., a cellular transceiver) for establishing communications via a cellular network. In various embodiments, the fallback device is a reduced capability device, for example supporting only certain types of communications, certain bands of communications, and/or certain bandwidths and the like, but reliably doing so via the cellular network. It should be understood that this example embodiment is illustrative, and therefore should not be construed as being limiting in any way.

The gateway, the fallback device, and a remote service such as the connectivity service can be configured to monitor communications of the gateway via the fiber network. When the gateway or the fallback device determines that the connection between the gateway and the fiber network has been lost, or when the connectivity service determines, based on analysis of network data from a network monitor that indicates that the gateway has lost or is about to lose connectivity with the fiber network, the gateway can be configured to switch its primary communication channel from the fiber network to the cellular network (relayed through the fallback device). Namely, the gateway can wirelessly communicate with the fallback device to relay communications to and/or from the fallback device, whereby communications directed via the gateway can seamlessly be relayed through the fallback device and through the cellular network instead of being sent by the gateway directly into the fiber network. In some embodiments, devices communicating with the gateway can be instructed by the gateway to connect directly to the fallback device instead. Both example embodiments are illustrative and should not be construed as being limiting in any way.

As communications are routed through the fallback device, the fallback device, the gateway, and/or the connectivity service can monitor a status of a connection between the gateway and the fiber network. If it is determined that the gateway has reconnected to the fiber network, communications via the fallback device can be terminated and routed and/or relayed back to the gateway, thereby shifting communications back to the fiber network instead of the cellular network. The fallback device also can be configured to be portable to enable a user or device to connect to the cellular network at almost any location. It should be understood that this example embodiment is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include establishing, with a gateway, wireless communications. The gateway can communicate via a connection with a fiber network. The operations further can include monitoring the connection with the fiber network to determine if the connection with the fiber network has been lost by the gateway; and if a determination is made that the connection with the fiber network has been lost by the gateway, activating, at a fallback device, a cellular connection with a cellular network and relaying communications from the gateway to the cellular network. The operations further can include monitoring the connection with the fiber network to determine if the connection with the fiber network has been reestablished by the gateway; and if a determination is made that the connection with the fiber network has been reestablished by the gateway, terminating, by the fallback device, the cellular connection, thereby causing the communications from the gateway to be directed to the fiber network.

In some embodiments, the wireless communications can be conducted via WiFi between the gateway and the fallback device. In some embodiments, monitoring the connection with the fiber network can include obtaining, from a connectivity service, data that indicates a status of the connection with the fiber network. In some embodiments, the connectivity service can obtain network data from a network monitor to determine the status of the connection with the fiber network.

In some embodiments, the fallback device can include a reduced capability device having a cellular transceiver, and relaying the communications from the gateway to the cellular network can include receiving, from the gateway and via the wireless communications, the communications and sending the communications to the cellular network. In some embodiments, the fallback device can connect to the gateway via physical connectors, and the fallback device can include a rechargeable battery that can be charged via a power supply of the gateway. In some embodiments, the fallback device can include a stackable reduced capability device, and the fallback device can be inductively charged by the gateway.

According to another aspect of the concepts and technologies disclosed herein, a method is disclosed. The method can include establishing, by a fallback device and with a gateway, wireless communications. The gateway can communicate via a connection with a fiber network. The method further can include monitoring, by the fallback device, the connection with the fiber network to determine if the connection with the fiber network has been lost by the gateway; and if a determination is made that the connection with the fiber network has been lost by the gateway, activating, by the fallback device and at the fallback device, a cellular connection with a cellular network and relaying communications from the gateway to the cellular network. The method further can include monitoring, by the fallback device, the connection with the fiber network to determine if the connection with the fiber network has been reestablished by the gateway; and if a determination is made that the connection with the fiber network has been reestablished by the gateway, terminating, by the fallback device, the cellular connection, thereby causing the communications from the gateway to be directed to the fiber network In some embodiments, the wireless communications can be conducted via WiFi between the gateway and the fallback device. In some embodiments, monitoring the connection with the fiber network can include obtaining, from a connectivity service, data that indicates a status of the connection with the fiber network. In some embodiments, the connectivity service can obtain network data from a network monitor to determine the status of the connection with the fiber network.

In some embodiments, the fallback device can include a reduced capability device having a cellular transceiver, and relaying the communications from the gateway to the cellular network can include receiving, from the gateway and via the wireless communications, the communications and sending the communications to the cellular network. In some embodiments, the fallback device can connect to the gateway via physical connectors, and the fallback device can include a rechargeable battery that can be charged via a power supply of the gateway. In some embodiments, the fallback device can include a stackable reduced capability device, and the fallback device can be inductively charged by the gateway.

According to yet another aspect of the concepts and technologies disclosed herein, a computer storage medium is disclosed. The computer storage medium can store computer-executable instructions that, when executed by a processor, cause the processor to perform operations. The operations can include establishing, with a gateway, wireless communications. The gateway can communicate via a connection with a fiber network. The operations further can include monitoring the connection with the fiber network to determine if the connection with the fiber network has been lost by the gateway; and if a determination is made that the connection with the fiber network has been lost by the gateway, activating, at a fallback device, a cellular connection with a cellular network and relaying communications from the gateway to the cellular network. The operations further can include monitoring the connection with the fiber network to determine if the connection with the fiber network has been reestablished by the gateway; and if a determination is made that the connection with the fiber network has been reestablished by the gateway, terminating, by the fallback device, the cellular connection, thereby causing the communications from the gateway to be directed to the fiber network.

In some embodiments, the wireless communications can be conducted via WiFi between the gateway and the fallback device. In some embodiments, monitoring the connection with the fiber network can include obtaining, from a connectivity service, data that indicates a status of the connection with the fiber network. In some embodiments, the connectivity service can obtain network data from a network monitor to determine the status of the connection with the fiber network.

In some embodiments, the fallback device can include a reduced capability device having a cellular transceiver, and relaying the communications from the gateway to the cellular network can include receiving, from the gateway and via the wireless communications, the communications and sending the communications to the cellular network. In some embodiments, the fallback device can connect to the gateway via physical connectors, and the fallback device can include a rechargeable battery that can be charged via a power supply of the gateway. In some embodiments, the fallback device can include a stackable reduced capability device, and the fallback device can be inductively charged by the gateway.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
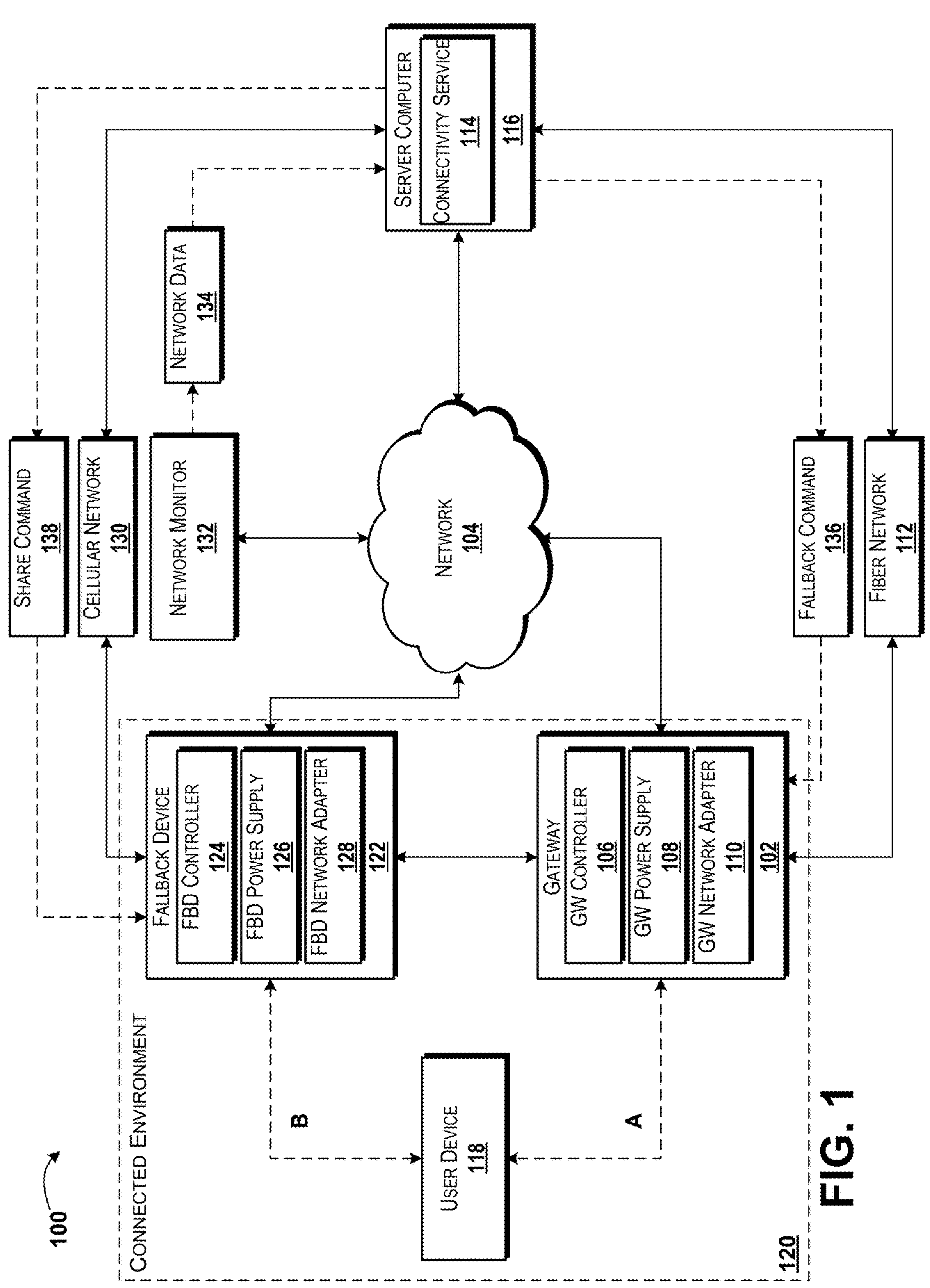
FIG. 1 is a system diagram illustrating an illustrative operating environment for various embodiments of the concepts and technologies described herein.

The following detailed description is directed to low-cost energy-efficient network-managed and device-managed continuous connectivity. A gateway can be located at a location to create a connected environment. The connected environment can correspond to a home, a business, a vehicle, or other location or entity at which one or more devices (e.g., a user device, Internet-of-things devices, computers, home alarm systems, combinations thereof, or the like) connect to the Internet and/or other networks via the gateway. According to various embodiments, the gateway can connect to a fiber network, though other network connections (e.g., fixed satellite, wireless, and the like) are possible and are contemplated.

The gateway can include a stackable fallback device, which can be connected to the gateway directly and/or wirelessly. The fallback device can include a fallback device network adapter that can include a cellular networking device (e.g., a cellular transceiver) for establishing communications via a cellular network. In various embodiments, the fallback device is a reduced capability device, for example supporting only certain types of communications, certain bands of communications, and/or certain bandwidths and the like, but reliably doing so via the cellular network. It should be understood that this example embodiment is illustrative, and therefore should not be construed as being limiting in any way.

The gateway, the fallback device, and a remote service such as the connectivity service can be configured to monitor communications of the gateway via the fiber network. When the gateway or the fallback device determines that the connection between the gateway and the fiber network has been lost, or when the connectivity service determines, based on analysis of network data from a network monitor that indicates that the gateway has lost or is about to lose connectivity with the fiber network, the gateway can be configured to switch its primary communication channel from the fiber network to the cellular network (relayed through the fallback device). Namely, the gateway can wirelessly communicate with the fallback device to relay communications to and/or from the fallback device, whereby communications directed via the gateway can seamlessly be relayed through the fallback device and through the cellular network instead of being sent by the gateway directly into the fiber network. In some embodiments, devices communicating with the gateway can be instructed by the gateway to connect directly to the fallback device instead. Both example embodiments are illustrative and should not be construed as being limiting in any way.

As communications are routed through the fallback device, the fallback device, the gateway, and/or the connectivity service can monitor a status of a connection between the gateway and the fiber network. If it is determined that the gateway has reconnected to the fiber network, communications via the fallback device can be terminated and routed and/or relayed back to the gateway, thereby shifting communications back to the fiber network instead of the cellular network. The fallback device also can be configured to be portable to enable a user or device to connect to the cellular network at almost any location. It should be understood that this example embodiment is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for low-cost energy-efficient network-managed and device-managed continuous connectivity will be described, according to an illustrative embodiment. The operating environment 100 shown in FIG. 1 includes a gateway 102. The gateway 102 can operate in communication with and/or as part of a communications network ("network") 104, though this is not necessarily the case.

According to various embodiments, the functionality of the gateway 102 may be provided by one or more instances of customer premises equipment ("CPE") such as, for example, a home or office gateway device, a set-top box ("STB") or set-top unit ("STU"), a home or office router, other computing systems, or the like. It should be understood that the functionality of the gateway 102 may be provided by a single device, by two or more similar devices, and/or by two or more dissimilar devices. For purposes of describing the concepts and technologies disclosed herein, the gateway 102 is described herein as a home gateway device for providing Internet connectivity for a home or other location. It should be understood that this embodiment is illustrative, and should not be construed as being limiting in any way.

The gateway 102 can execute an operating system (not labeled in FIG. 1) and one or more application programs such as, for example, a gateway controller 106 (labeled "GW controller" in FIG. 1). The operating system can include a computer program that can control the operation of the gateway 102. The gateway controller 106 can include an executable program that can be configured to execute on top of the operating system to provide various functions as illustrated and described herein for providing network-managed and device-managed continuous connectivity. The function of the gateway controller 106 will be explained in more detail below after introducing other components of the operating environment 100.

The gateway 102 also can include a gateway power supply 108 (labeled "GW power supply" in FIG. 1). The gateway power supply 108 can include a power supply unit ("PSU") or other device for converting an alternating current ("AC") power source to a direct current ("DC") power supply for the gateway 102. Thus, for example, the gateway power supply 108 can include an AC2DC converter or other functionality for powering the gateway 102 using a power source such as a power outlet or the like. It should be understood that this example embodiment is illustrative, and therefore should not be construed as being limiting in any way. The gateway power supply 108 also can include one or more batteries for powering the gateway 102 and/or providing a backup power source for the gateway 102. In some contemplated embodiments, the gateway power supply 108 can include one or more rechargeable batteries and one or more charging units for continuously powering the gateway 102 and charging the batteries (thereby enabling operation of the gateway 102 during power outages and the like). It should be understood that this example embodiment is illustrative, and therefore should not be construed as being limiting in any way.

The gateway 102 also can include a gateway network adapter 110 (labeled "GW network adapter" in FIG. 1). The gateway network adapter 110 can include one or more network interfaces for the gateway 102. The gateway network adapter 110 can include, for example, a networking card having an ethernet port (e.g., for hardwired ethernet connections, or the like), a fiber modem interface, or other types of ports or interfaces for connecting the gateway 102 to a wired data source. In various embodiments of the concepts and technologies disclosed herein, the gateway network adapter 110 also can include one or more wireless network adapters such as WiFi transceivers, Bluetooth transceivers, or the like. In the illustrated embodiment, the gateway network adapter 110 includes a networking device for providing a connection to a fiber network 112 and a wireless networking device. It should be understood that this example embodiment is illustrative, and therefore should not be construed as being limiting in any way.

The gateway 102 also can be configured to communicate with a connectivity service 114. The connectivity service 114 can be executed and/or hosted by a server computer 116 in various embodiments. The functionality of the connectivity service 114 will be illustrated and described in more detail hereinbelow after introducing additional components of the operating environment 100. In the illustrated embodiment shown in FIG. 1, the gateway 102 can communicate with the connectivity service 114 via the fiber network 112. In a preferred mode of operation, the gateway 102 can connect to the fiber network 112, and provide connectivity to one or more devices located in proximity to the gateway 102 such as, for example, a user device 118. The user device 118 and the gateway 102 can both be located in a connected environment 120 such as a home, a business, an office, or the like, for example a home that is serviced by the gateway 102. It should be understood that this example embodiment is illustrative, and therefore should not be construed as being limiting in any way.

According to various embodiments of the concepts and technologies disclosed herein, the gateway 102 can also include and/or be connected to a fallback device 122. According to various embodiments of the concepts and technologies disclosed herein, the fallback device 122 can include a stackable reduced capability ("RedCap") device that can provide fallback connectivity for the gateway 102 and/or devices connected thereto. According to some embodiments, the fallback device 122 can include a fallback device controller 124 (labeled "FBD controller" in FIG. 1), which can control the fallback device 122 and/or how the fallback device 122 is activated and/or used. The functionality of the fallback device controller 124 will be explained in more detail hereinbelow after introducing the other components of the operating environment 100.

The fallback device 122 also can include a fallback device power supply 126 (labeled "FBD power supply" in FIG. 1). The fallback device power supply 126 can include one or more batteries for powering the fallback device 122. In some contemplated embodiments, the fallback device power supply 126 can include one or more rechargeable batteries, and the batters may be charged via power supply or the like for the fallback device 122. Thus, the rechargeable batteries may be continuously charged (thereby enabling operation of the fallback device 122 during power outages and the like). It should be understood that this example embodiment is illustrative, and therefore should not be construed as being limiting in any way.

The fallback device 122 also can include a fallback device network adapter 128 (labeled "FBD network adapter" in FIG. 1). The fallback device network adapter 128 can include one or more network interfaces for the fallback device 122. According to various embodiments of the concepts and technologies disclosed herein, the fallback device network adapter 128 can include at least a cellular transceiver for connecting the fallback device 122 to a cellular network 130. In various embodiments of the concepts and technologies disclosed herein, the fallback device network adapter 128 also can include one or more other types of wireless network adapters such as WiFi transceivers, Bluetooth transceivers, or the like. According to various embodiments of the concepts and technologies disclosed herein, the fallback device 122 can wirelessly connect to the gateway 102 using a peer-to-peer wireless technology such as WiFi, Bluetooth, or the like. It should be understood that this example embodiment is illustrative, and therefore should not be construed as being limiting in any way.

The fallback device 122 also can be configured to communicate with the connectivity service 114, and the connectivity service 114 can be configured to control aspects of the fallback device 122 and/or the gateway 102. It should be understood that this example embodiment is illustrative, and therefore should not be construed as being limiting in any way. At any rate, these and some other aspects of the concepts and technologies disclosed herein will be described in more detail hereinbelow after introducing the other components of the operating environment 100.

As shown in FIG. 1, the operating environment 100 also can include a network monitor 132. The network monitor 132 can be configured to monitor the network 104 and/or portions thereof including, but not limited to, the fiber network 112 and/or the cellular network 130. The network monitor 132 can be configured to generate network data 134, for example as releases or instances of netflow data, which can be released by the network monitor 132 and/or otherwise provided by the network monitor 132 to the connectivity service 114. It should be understood that this example embodiment is illustrative, and therefore should not be construed as being limiting in any way.

Returning now to the functionality of the gateway controller 106, aspects of the concepts and technologies disclosed herein for providing continuous connectivity will be described. According to various embodiments of the concepts and technologies disclosed herein, the gateway controller 106 can be configured to control various aspects of the gateway 102, including at least the connection of the gateway 102 to the fiber network 112, the connection of the gateway 102 to the fallback device 122, and the provisioning of connectivity (via the fiber network 112 and/or via the connection to the cellular network 130 provided by the fallback device 122) to one or more devices in the connected environment 120 such as, for example, the user device 118.

In particular, the gateway 102 can include functionality for connecting to the Internet (e.g., via the fiber network 112) and providing that connectivity (e.g., via a WiFi router, ethernet ports, and/or other functionality) to one or more devices located at the connected environment 120. As used herein, the connected environment 120 can correspond to a communication range of the gateway 102, and therefore a range within which devices such as the user device 118 can connect to the fiber network 112 via the gateway 102. It should be understood that this example embodiment is illustrative, and therefore should not be construed as being limiting in any way.

The gateway controller 106 can be configured to detect connection of the gateway 102 to the fiber network 112. According to various embodiments of the concepts and technologies disclosed herein, the gateway controller 106 can determine that the gateway 102 has connected to the fiber network 112 by detecting activity via the gateway network adapter 110 (e.g., a network interface that connects to the fiber network 112). Because the gateway controller 106 can detect connection of the gateway 102 to the fiber network 112 in additional or alternative manners, it should be understood that this example embodiment is illustrative, and therefore should not be construed as being limiting in any way.

The gateway controller 106 also can detect connection of the gateway 102 to the fallback device 122. According to various embodiments of the concepts and technologies disclosed herein, the gateway controller 106 can determine that the gateway 102 has connected to the fallback device 122 by detecting a wireless data session with the fallback device 122 (e.g., detecting a peer-to-peer connection such as a WiFi connection, a Bluetooth connection, or the like). In some embodiments, the fallback device 122 and the gateway 102 can connect via hardware connections to share power and/or connectivity, though this is not necessarily the case in all embodiments. At any rate, because the gateway controller 106 can detect connection of the gateway 102 to the fiber network 112 in additional or alternative manners, it should be understood that this example embodiment is illustrative, and therefore should not be construed as being limiting in any way.

The gateway controller 106 can also be configured to monitor the connection between the gateway 102 and the fiber network 112 to determine, for example, the health and/or activity associated with the connection, or the like. The gateway controller 106 also can be configured to determine, based on data from the fallback device 122, the status of the cellular connection between the fallback device 122 and the cellular network 130 (e.g., connected, healthy, etc.). Thus, the gateway controller 106 can determine a status of a connection between the gateway 102 and the fiber network 112, the gateway 102 and the fallback device 122, and/or the gateway 102 and one or more devices such as the user device 118. It should be understood that this example embodiment is illustrative, and therefore should not be construed as being limiting in any way.

If the gateway controller 106 determines that the connection with the fiber network 112 has been lost, the gateway controller 106 can be configured to use a cellular connection provided by and shared by the fallback device 122 to replace the connectivity previously provided by the connection to the fiber network 112. Namely, the fallback device 122 can be configured to provide, on-demand and/or at other times, Internet connectivity via the cellular network 130 to the gateway 102 and/or other devices such as the user device 118. In various embodiments, the fallback device 122 can be configured to provide connectivity to the gateway 102 and devices connected to the gateway 102 may not be aware of changes to the network via which the Internet connectivity is being provided (e.g., the fiber network 112 via a fiber network interface included in the gateway network adapter 110 or the cellular network 130 via a cellular network interface included in the fallback device network adapter 128). Because the fallback device 122 can be a reduced capability device and may provide limited connectivity (e.g., lower bandwidth, lower speed, etc., relative to the connection via the fiber network 112), the fallback device 122 can be a low-cost and/or efficient way to provide continuous connectivity to devices connected to the gateway 102 in various embodiments. It should be understood that this example embodiment is illustrative, and therefore should not be construed as being limiting in any way.

According to various embodiments of the concepts and technologies disclosed herein, the gateway controller 106 can also be configured to maintain the availability of a connection to the fiber network 112 after communications fallback to the fallback device 122. Namely, the gateway controller 106 can continue to monitor the fiber network 112 and/or a connection therewith and determine, at any particular moment, if the connection to the fiber network 112 has become available again. If the connection to the fiber network 112 is determined by the gateway controller 106 to be available, the gateway controller 106 can be configured to reconnect to the fiber network 112 and to provide Internet connectivity to the devices connected to the gateway 102 (e.g., the user device 118) via the fiber network 112 instead of providing connectivity via the fallback device 122 (and thereby through the cellular network 130). It should be understood that this example embodiment is illustrative, and therefore should not be construed as being limiting in any way.

The gateway controller 106 also can be configured to determine, at startup, activation, and/or at other times, what type of network connection is to be treated as primary by the gateway 102. In some embodiments, for example, the gateway 102 can be configured to use a fiber network connection as a primary network connection and to use the fallback device 122 (and the cellular connectivity provided thereby) as a backup connection. As such, the gateway controller 106 can cause the gateway 102 to select and/or connect to the primary network at various times. It should be understood that this example embodiment is illustrative, and therefore should not be construed as being limiting in any way.

The fallback device controller 124 can be configured to control connection of the fallback device 122 to a network connection, connection to other devices in proximity to the fallback device 122 such as, for example, the gateway 102, the user device 118, and the like. Thus, the fallback device controller 124 can be configured to detect connection of the fallback device 122 to the cellular network 130. According to various embodiments of the concepts and technologies disclosed herein, the fallback device controller 124 can determine that the fallback device 122 has connected to the cellular network 130 by detecting activity via the fallback device network adapter 128 (e.g., a network interface that connects to the cellular network 130). Because the fallback device controller 124 can detect connection of the fallback device 122 to the cellular network 130 in additional or alternative manners, it should be understood that this example embodiment is illustrative, and therefore should not be construed as being limiting in any way.

The fallback device controller 124 also can detect connection of the fallback device 122 to the gateway 102 and/or other devices such as the user device 118. According to various embodiments of the concepts and technologies disclosed herein, the fallback device controller 124 can determine that the gateway 102 or the user device 118 has connected to the fallback device 122 by detecting a wireless data session with the gateway 102 or the user device 118 (e.g., detecting a peer-to-peer connection such as a WiFi connection, a Bluetooth connection, or the like). In some embodiments, the gateway 102 and the fallback device 122 can connect to one another via hardware connections to share power and/or connectivity, though this is not necessarily the case in all embodiments. At any rate, because the fallback device controller 124 can detect connection of the fallback device 122 to the cellular network 130 in additional or alternative manners, it should be understood that this example embodiment is illustrative, and therefore should not be construed as being limiting in any way.

The fallback device controller 124 can also be configured to monitor the connection between the fallback device 122 and the cellular network 130 to determine, for example, the health and/or activity associated with the connection, or the like. The fallback device controller 124 also can be configured to determine, based on data from the gateway 102, the status of the fiber connection between the gateway 102 and the fiber network 112 (e.g., whether the gateway 102 is connected to the fiber network 112, if the connection to the fiber network 112 is healthy and/or active, etc.). Thus, the fallback device controller 124 can determine a status of a connection between the fallback device 122 and the cellular network 130, the fallback device 122 and the gateway 102, and/or the fallback device 122 and one or more devices such as the user device 118. It should be understood that this example embodiment is illustrative, and therefore should not be construed as being limiting in any way.

If the fallback device controller 124 determines that the connection of the gateway 102 with the fiber network 112 has been lost, the fallback device controller 124 can be configured to provide connectivity provided via the cellular connection to one or more devices connected thereto such as, for example, the gateway 102, the user device 118, and/or other devices to replace the connectivity previously provided by the connection to the gateway 102. Namely, the fallback device 122 can be configured to provide, on-demand and/or at other times, Internet connectivity via the cellular network 130 to the gateway 102, the user device 118, and/or other devices. The fallback device controller 124 can continue to monitor the connection between the gateway 102 and the fiber network 112 and/or a connection therewith and determine, at any particular moment, if the connection to the fiber network 112 has become available again. If the connection to the fiber network 112 is determined by the fallback device controller 124 to be available, the fallback device controller 124 can be configured to terminate the connection to the cellular network 130 and to thereby cause the gateway 102 to provide Internet connectivity to the devices connected to the gateway 102 (e.g., the user device 118) via the fiber network 112. It should be understood that this example embodiment is illustrative, and therefore should not be construed as being limiting in any way.

The connectivity service 114 can be configured to control the connections of and/or between the gateway 102 and the fallback device 122. In particular, the connectivity service 114 can be configured to obtain, from the network monitor 132, network data 134. The network data 134 can be obtained as a data stream of network data 134, as releases of network data files, and/or in other formats. The connectivity service 114 can analyze the network data 134 and determine, based on the analyzed network data 134, if the gateway 102 is expected to lose its connection with the fiber network 112. According to various embodiments of the concepts and technologies disclosed herein, the connectivity service 114 can make this determination in several ways. In some embodiments, for example, the connectivity service 114 can include an artificial intelligence ("AI") module and/or machine learning ("ML") that can be trained to detect network and/or power outages associated with a particular location, and to recognize patterns and/or causes for such outages. Thus, the connectivity service 114 may determine that such patterns or causes are detected in the network data 134 analyzed by the connectivity service 114, thereby determining that an outage is possible or expected at the gateway 102 at some particular time. It should be understood that this example embodiment is illustrative, and therefore should not be construed as being limiting in any way.

If the connectivity service 114 determines, at any particular time, that gateway 102 is going to lose connection (to the fiber network 112), the connectivity service 114 can generate a fallback command 136. The fallback command 136 can include computer-executable instructions that, when executed by the gateway 102, can cause the gateway 102 to connect to the fallback device 122 (if not yet connected) or to use the connection provided by the fallback device 122 as the primary connection of the gateway 102 (if already connected). In some embodiments, the connectivity service 114 also can be configured to generate a share command 138 in some embodiments. The share command 138 can include computer-executable instructions that, when executed by the fallback device 122, can cause the fallback device 122 to make its connection to the cellular network 130 available to the gateway 102. Thus, the share command 138 can effectively inform the fallback device 122 to share its connection (e.g., with the cellular network 130) with the gateway 102. It should be understood that this example embodiment is illustrative, and therefore should not be construed as being limiting in any way.

The connectivity service 114 can send the fallback command 136 to the gateway 102 (and, optionally the share command 138 to the fallback device 122). Upon receiving the fallback command 136, the gateway 102 can be configured to connect to the fallback device 122 and to use the connectivity provided by the fallback device 122 via the cellular network 130 in place of the connection to the fiber network 112 (with which connectivity has been lost). The share command 138, if used, can inform the fallback device 122 that its connection with the cellular network 130 should be used and/or made available to the gateway 102 and/or other devices such as the user device 118. It should be understood that this example embodiment is illustrative, and therefore should not be construed as being limiting in any way.

The connectivity service 114 also can be configured to monitor the fiber network 112 and to determine, at any time, that the connection between the gateway 102 and the fiber network 112 is again available (e.g., that the gateway 102 has reconnected to the fiber network 112). Upon determining that the gateway 102 has reconnected to the fiber network 112, the connectivity service 114 can be configured to command the gateway 102 to share its connection (to the fiber network 112) with devices connected to the gateway 102 (e.g., the user device 118) and to stop using the connection to the cellular network 130 provided by the fallback device 122. Similarly, the connectivity service 114 can inform the fallback device 122 that it can stop sharing its connection to the cellular network 130. It should be understood that this example embodiment is illustrative, and therefore should not be construed as being limiting in any way.

According to various embodiments of the concepts and technologies disclosed herein, the user device 118 can be configured to obtain Internet connectivity (or other network connections) via the gateway 102 and/or the fallback device 122. Thus, while the fallback device 122 has been illustrated and described herein as providing a fallback connection for the gateway 102, it should be understood that in various embodiments the fallback device 122 can also be used as a portable version of the gateway 102, providing network connectivity to devices in its proximity at any particular time. It should be understood that this example embodiment is illustrative, and therefore should not be construed as being limiting in any way.

In practice, a gateway 102 can be located at a location to create a connected environment 120. The connected environment 120 can correspond to a home, a business, a vehicle, or other location or entity at which one or more devices (e.g., a user device 118, Internet-of-things devices, computers, home alarm systems, combinations thereof, or the like) connect to the Internet and/or other networks via the gateway 102. According to various embodiments, the gateway 102 can connect to a fiber network 112, though other network connections (e.g., fixed satellite, wireless, and the like) are possible and are contemplated.

The gateway 102 can include a stackable fallback device 122, which can be connected to the gateway 102 directly and/or wirelessly. The fallback device 122 can include a fallback device network adapter 128 that can include a cellular networking device (e.g., a cellular transceiver) for establishing communications via a cellular network 130. In various embodiments, the fallback device 122 is a reduced capability device, for example supporting only certain types of communications, certain bands of communications, and/or certain bandwidths and the like, but reliably doing so via the cellular network 130. It should be understood that this example embodiment is illustrative, and therefore should not be construed as being limiting in any way.

The gateway 102, the fallback device 122, and a remote service such as the connectivity service 114 can be configured to monitor communications of the gateway 102 via the fiber network 112. When the gateway 102 or the fallback device 122 determines that the connection between the gateway 102 and the fiber network 112 has been lost, or when the connectivity service 114 determines, based on analysis of network data 134 from a network monitor 132 that indicates that the gateway 102 has lost or is about to lose connectivity with the fiber network 112, the gateway 102 can be configured to switch its primary communication channel from the fiber network 112 to the cellular network 130 (relayed through the fallback device 122). Namely, the gateway 102 can wirelessly communicate with the fallback device 122 to relay communications to and/or from the fallback device 122, whereby communications directed via the gateway 102 can seamlessly be relayed through the fallback device 122 and through the cellular network 130 instead of being sent by the gateway 102 directly into the fiber network 112. In some embodiments, devices communicating with the gateway 102 can be instructed by the gateway 102 to connect directly to the fallback device 122 instead. Both example embodiments are illustrative and should not be construed as being limiting in any way.

As communications are routed through the fallback device 122, the fallback device 122, the gateway 102, and/or the connectivity service 114 can monitor a status of a connection between the gateway 102 and the fiber network 112. If it is determined that the gateway 102 has reconnected to the fiber network 112, communications via the fallback device 122 can be terminated and routed and/or relayed back to the gateway 102, thereby shifting communications back to the fiber network 112 instead of the cellular network 130. The fallback device 122 also can be configured to be portable to enable a user or device to connect to the cellular network 130 at almost any location. It should be understood that this example embodiment is illustrative, and therefore should not be construed as being limiting in any way.

FIG. 1 illustrates one gateway 102, one network 104, one fiber network 112, one server computer 116, one user device 118, one connected environment 120, one fallback device 122, one cellular network 130, and one network monitor 132. It should be understood, however, that various implementations of the operating environment 100 can include zero, one, or more than one gateway 102; zero, one, or more than one network 104; one or more than one fiber network 112; one or more than one server computer 116; one or more than one user device 118; one or more than one connected environment 120; one or more than one fallback device 122; one or more than one cellular network 130; and zero, one, or more than one network monitor 132. As such, the illustrated embodiment should be understood as being illustrative, and should not be construed as being limiting in any way.

Figure 2:
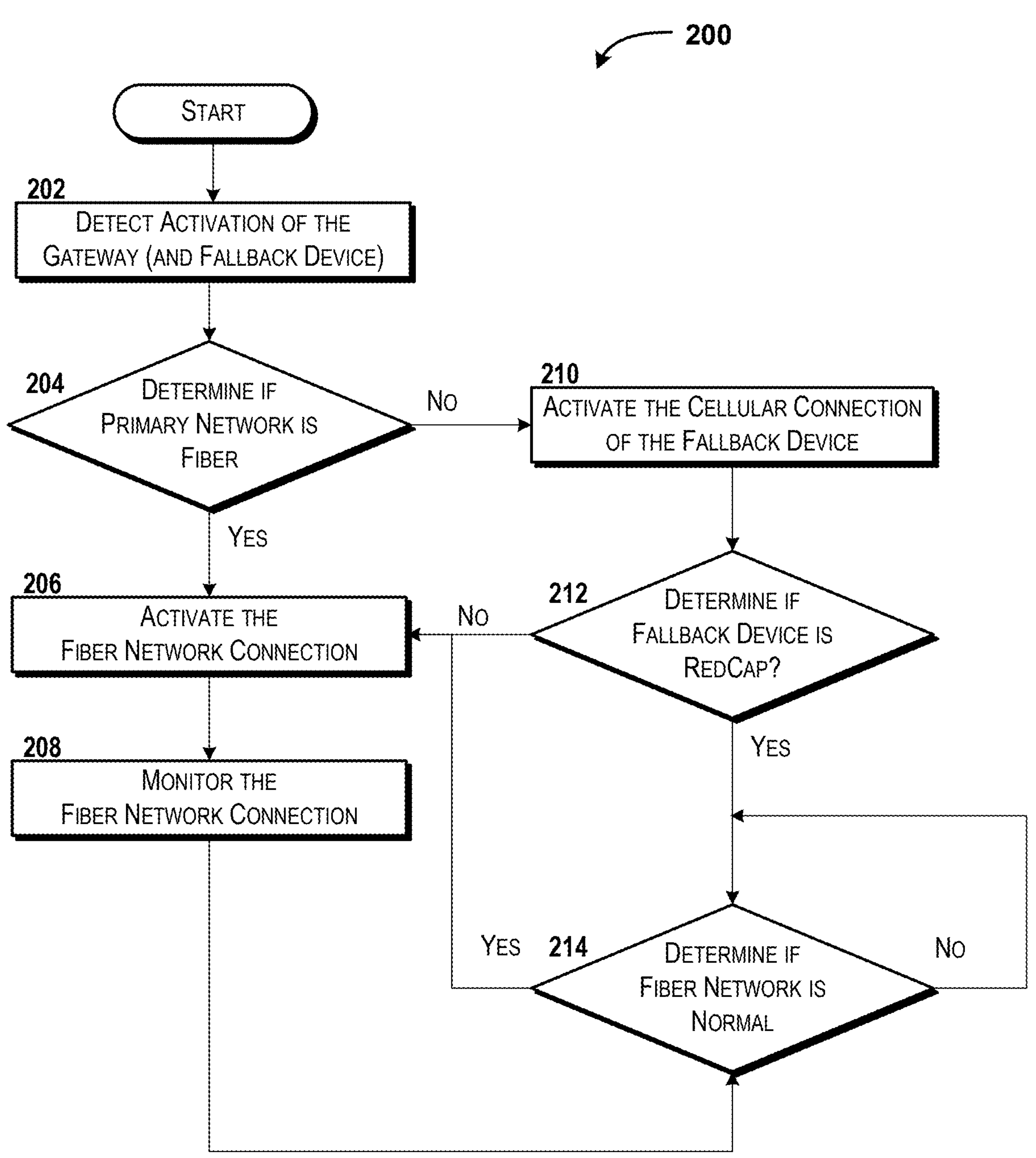
FIG. 2 is a flow diagram showing aspects of a method for activating and operating a gateway having a stackable fallback device, according to an illustrative embodiment of the concepts and technologies described herein.

Turning now to FIG. 2, aspects of a method 200 for activating and operating a gateway having a stackable fallback device will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the gateway 102, to perform one or more operations and/or causing the processor to direct other components of the computing system or device to perform one or more of the operations.

For purposes of illustrating and describing the concepts of the present disclosure, the method 200 is described herein as being performed by the gateway 102 via execution of one or more software modules such as, for example, the gateway controller 106. It should be understood that additional and/or alternative devices and/or network nodes can provide the functionality described herein via execution of one or more modules, applications, and/or other software including, but not limited to, the gateway controller 106. Thus, the illustrated embodiments are illustrative, and should not be viewed as being limiting in any way.

The method 200 begins at operation 202. At operation 202, the gateway 102 can detect activation of the gateway

102. In various embodiments of the concepts and technologies disclosed herein, the gateway 102 can include a stackable fallback device 122. Operation 202 can correspond to the gateway 102 being powered on, being activated (e.g., at installation or the like), being rebooted, and/or otherwise being turned on or activated for operation. Although not separately illustrated in FIG. 2, it should be understood that the gateway 102 can be configured to initiate a connection with a fallback device 122 as part of a setup or activation procedure, thereby creating a fallback connection for the gateway 102 as illustrated and described herein.

From operation 202, the method 200 can proceed to operation 204. At operation 204, the gateway 102 can determine if a primary network for the gateway 102 is the fiber network 112. In some embodiments, the gateway 102 can determine, in operation 204, if the primary network for the gateway 102 is the cellular network 130. In any event, in operation 204 the gateway 102 can determine whether the primary connection for the gateway 102 is a fiber network 112 or other type of network that can be accessed via an interface of the gateway 102, or if the primary connection for the gateway 102 is the cellular network 130 or other network connection that can be connected to via the fallback device 122. This determination can be based, for example, on one or more configurations, settings, preferences, or the like, or based on network or infrastructure conditions at the gateway 102 at any particular time. Because the determination of operation 204 can be made in additional and/or alternative manners, it should be understood that these example embodiments are illustrative, and therefore should not be construed as being limiting in any way.

If the gateway 102 determines, in operation 204, that the primary network for the gateway 102 is the fiber network 112, the method 200 can proceed to operation 206. In operation 206, the gateway 102 can activate the fiber network connection. In some embodiments, the gateway 102 can activate one or more gateway network adapter 110 such as, for example, a fiber network device, an ethernet connection, or the like.

From operation 206, the method 200 can proceed to operation 208. At operation 208, the gateway 102 can monitor the fiber network connection activated in operation 206. In some embodiments, the gateway 102 can directly monitor the connection by monitoring activity of the gateway network adapter 110. Thus, for example, the gateway 102 can determine how much data has been transmitted via the gateway network adapter 110. If activity via the gateway network adapter 110 stops or is interrupted, the gateway 102 can be configured to determine that the fiber network 112 (or other network that can be accessed via the gateway network adapter 110) is unavailable or offline. Meanwhile, network activity via the gateway network adapter 110 can be interpreted by the gateway 102 as indicating that the fiber network 112 is available or online. It should be understood that this example embodiment is illustrative, and therefore should not be construed as being limiting in any way.

In some other embodiments of the concepts and technologies disclosed herein, the gateway 102 can be configured to indirectly monitor the fiber network connection. For example, the gateway 102 can be configured to obtain, from a network monitor 132 or other device or entity, network data 134 that describes network activity associated with the gateway 102 (via the gateway network adapter 110). Thus, for example, the gateway 102 can determine how much data has been transmitted by the gateway 102 (via the gateway network adapter 110) and times, amounts, and/or other information associated with one or more data transmission. If activity of the gateway 102 (via the gateway network adapter 110) is determined to have been interrupted, the gateway 102 can be configured to determine that the fiber network 112 (or other network that can be accessed via the gateway network adapter 110) is unavailable or offline. Meanwhile, network activity via the gateway network adapter 110 can be interpreted by the gateway 102 as indicating that the fiber network 112 is available or online. It should be understood that this example embodiment is illustrative, and therefore should not be construed as being limiting in any way.

Returning to operation 204, if the gateway 102 determines, in operation 204, that the primary network for the gateway 102 is not the fiber network 112, the method 200 can proceed to operation 210. At operation 210, the gateway 102 can activate the fallback device network adapter 128 of the fallback device 122. In some embodiments of operation 210, the gateway 102 can instruct the fallback device 122 to activate the fallback device network adapter 128 such as, for example, a cellular transceiver.

From operation 210, the method 200 can proceed to operation 212. At operation 212, the gateway 102 can determine if the fallback device 122 is a reduced capability device. According to various embodiments of the concepts and technologies disclosed herein, the fallback device 122 can be designed as a reduced capability device, meaning it is designed to provide fallback connectivity for devices (e.g., the gateway 102, the user device 118, and other devices), but may not be designed to continually connect to the cellular network 130. Rather, the reduced capability device may be designed to connect to the cellular network 130 only when the gateway 102 (and devices connected thereto) loses connectivity with the fiber network 112. It should be understood that this example embodiment is illustrative, and therefore should not be construed as being limiting in any way.

At any rate, the gateway 102 may perform operation 212 in response to determining that the fiber network 112 is not the primary network for the gateway 102, and therefore operation 212 may be performed when the cellular connection is not performing well. It should be understood that this example embodiment is illustrative, and therefore should not be construed as being limiting in any way. At any rate, if the gateway 102 determines, in operation 212, that the fallback device 122 is not a reduced capability device, the method 200 can proceed to operation 214.

At operation 214, the gateway 102 can determine if the fiber network 112 is normal (e.g., operating normally). This determination can be based on analysis of communications occurring via the gateway network adapter 110. If these communications are occurring normally and/or if the connection is active, the gateway 102 can determine that the fiber network 112 is normal. If the gateway 102 determines, in operation 214, that the fiber network 112 is normal and/or is operating normally, the method 200 can flow to operation 206. As noted above, at operation 206, the gateway 102 can activate the fiber network connection. Thus, it can be appreciated that embodiments of the method 200 can cause the gateway 102 to fall back to the connection with the fiber network 112 to optimize performance of the gateway 102 (by selecting the network connection that provides optimized performance), to minimize use of the fallback device 122 (e.g., to minimize use of the cellular network 130), and/or for additional and/or alternative reasons.

If the gateway 102 determines, in operation 214, that the fiber network 112 is not normal (e.g., is not operating normally), the method 200 can return to operation 214.

Thus, it can be appreciated that operation 214 can be repeated until the gateway 102 determines, in any iteration of operation 214, that the fiber network is normal and/or until the gateway 102 and/or fallback device 122 are powered down or deactivated (e.g., turned off). Because additional and/or alternative operations can be added to the method 200 in various embodiments, it should be understood that this example embodiment is illustrative, and therefore should not be construed as being limiting in any way. Although no end block is illustrated in FIG. 2, it should be understood that the method 200 can be performed continually when the gateway 102 is powered on, and can be terminated at any time when a data connectivity session is terminated. Because the method 200 can be performed and/or terminated at any time, it should be understood that these example embodiments are illustrative, and therefore should not be construed as being limiting in any way.

Figure 3:
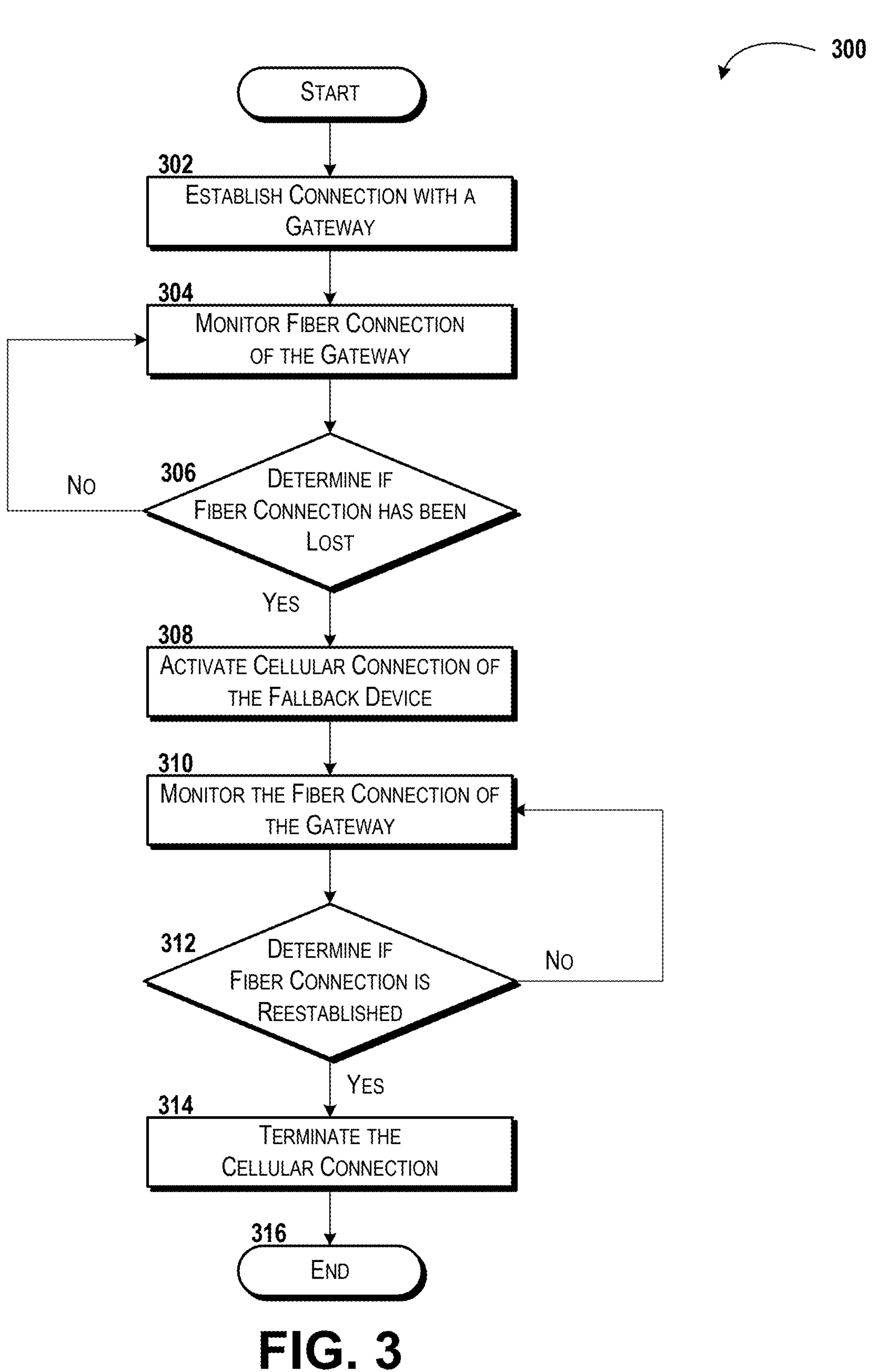
FIG. 3 is a flow diagram showing aspects of a method for activating and operating a fallback device for a gateway, according to an illustrative embodiment of the concepts and technologies described herein.

Turning now to FIG. 3, aspects of a method 300 for activating and operating a fallback device for a gateway will be described in detail, according to an illustrative embodiment. For purposes of illustrating and describing the concepts of the present disclosure, the method 300 is described herein as being performed by the fallback device 122 via execution of one or more software modules such as, for example, the fallback device controller 124. It should be understood that additional and/or alternative devices and/or network nodes can provide the functionality described herein via execution of one or more modules, applications, and/or other software including, but not limited to, the fallback device controller 124. Thus, the illustrated embodiments are illustrative, and should not be viewed as being limiting in any way.

The method 300 begins at operation 302. At operation 302, the fallback device 122 can establish a connection with a gateway 102. The connection between the fallback device 122 and the gateway 102 can be via direct connections (e.g., wires, buses, or the like) and/or wireless connections (e.g., induction charging, wireless data transfers, and the like). As such, operation 302 can correspond to the gateway 102 and the fallback device 122 being located in proximity to one another and/or being connected via physical interfaces. In any event, a communication channel (e.g., via WiFi, Bluetooth, or the like) can be established in operation 302.

From operation 302, the method 300 can proceed to operation 304. At operation 304, the fallback device 122 can monitor a fiber connection of the gateway 102 (e.g., a connection between the gateway 102 and a fiber network 112 via a gateway network adapter 110). In various embodiments, the fallback device 122 can be configured to access the fiber network 112 via the gateway 102 and/or can perform a ping or "can you hear me?" communication with and/or via the fiber network 112. In some other embodiments, the gateway 102 can be configured to periodically (e.g., every second, five seconds, thirty seconds, two minutes, or the like) update the fallback device 122 on the status of the connection between the gateway 102 and the fiber network 112. In yet other embodiments, the connectivity service 114 can monitor the connection between the gateway 102 and the fiber network 112 and inform the gateway 102 and/or the fallback device 122 of the status at various times. Regardless of how the status is tracked and/or communicated, the fallback device 122 can monitor that status in operation 304.

From operation 304, the method 300 can proceed to operation 306. At operation 306, the fallback device 122 can determine if the fiber connection of the gateway 102 has been lost. If the fallback device 122 determines, in operation 306, that the fiber connection of the gateway 102 has not been lost (e.g., that the connection with the fiber network 112 is normal and/or active), the method 300 can return to operation 304, and the fallback device 122 can continue monitoring the fiber connection of the gateway 102. As such, it can be appreciated that the fallback device 122 can iterate operations 304-306 until the fallback device 122 determines, in any iteration of operation 306, that the fiber connection of the gateway 102 has been lost.

If the fallback device 122 determines, in operation 306, that the fiber connection of the gateway 102 has been lost, the method 300 can proceed to operation 308. At operation 308, the fallback device 122 can activate a cellular connection (of the fallback device 122). In some embodiments of operation 308, the fallback device 122 can activate the fallback device network adapter 128 in operation 308 to create a connection between the fallback device 122 and the cellular network 130. As explained herein, the gateway 102 can be configured to communicate via the cellular connection as enabled by the fallback device 122. Thus, for example, if the fiber connection of the gateway 102 has failed, the cellular connection of the fallback device 122 can be used by the gateway 102 instead in some embodiments. It should be understood that this example embodiment is illustrative, and therefore should not be construed as being limiting in any way.

From operation 308, the method 300 can proceed to operation 310. At operation 310, the fallback device 122 can monitor a fiber connection of the gateway 102 (e.g., a connection between the gateway 102 and a fiber network 112 via a gateway network adapter 110). As noted above, the fallback device 122 can be configured to access the fiber network 112 via the gateway 102 and/or can perform a ping or periodic communication check with and/or via the fiber network 112. In some other embodiments, the gateway 102 can be configured to periodically (e.g., every second, five seconds, thirty seconds, two minutes, or the like) update the fallback device 122 on the status of the connection between the gateway 102 and the fiber network 112. In yet other embodiments, the connectivity service 114 can monitor the connection between the gateway 102 and the fiber network 112 and inform the gateway 102 and/or the fallback device 122 of the status at various times. Regardless of how the status is tracked and/or communicated, the fallback device 122 can monitor that status in operation 304.

From operation 310, the method 300 can proceed to operation 312. At operation 312, the fallback device 122 can determine if the fiber connection of the gateway 102 has been reestablished. If the fallback device 122 determines, in operation 312, that the fiber connection of the gateway 102 has not been reestablished (e.g., that the connection between the gateway 102 and the fiber network 112 is still not normal and/or is inactive), the method 300 can return to operation 310, and the fallback device 122 can continue monitoring the fiber connection of the gateway 102. As such, it can be appreciated that the fallback device 122 can iterate operations 310-312 until the fallback device 122 determines, in any iteration of operation 312, that the fiber connection of the gateway 102 has been reestablished.

If the fallback device 122 determines, in operation 312, that the fiber connection of the gateway 102 has been reestablished, the method 300 can proceed to operation 314. At operation 314, the fallback device 122 can terminate the cellular connection (of the fallback device 122). Although not shown in FIG. 3, it can be appreciated that the gateway 102 can reactivate the fiber connection and switch communications of the gateway 102 back to the fiber connection. It should be understood that this example embodiment is illustrative, and therefore should not be construed as being limiting in any way.

As such, it can be appreciated that the gateway 102 can be configured to fallback to cellular communications (via the fallback device 122) when the connection with the fiber network 112 is lost and to return to the communications with the fiber network 112 as soon as a connection with the fiber network 112 is reestablished (after having been lost). It should be understood that this example embodiment is illustrative, and therefore should not be construed as being limiting in any way.

From operation 314, the method 300 can proceed to operation 316. The method 300 can end at operation 316.

Figure 4:
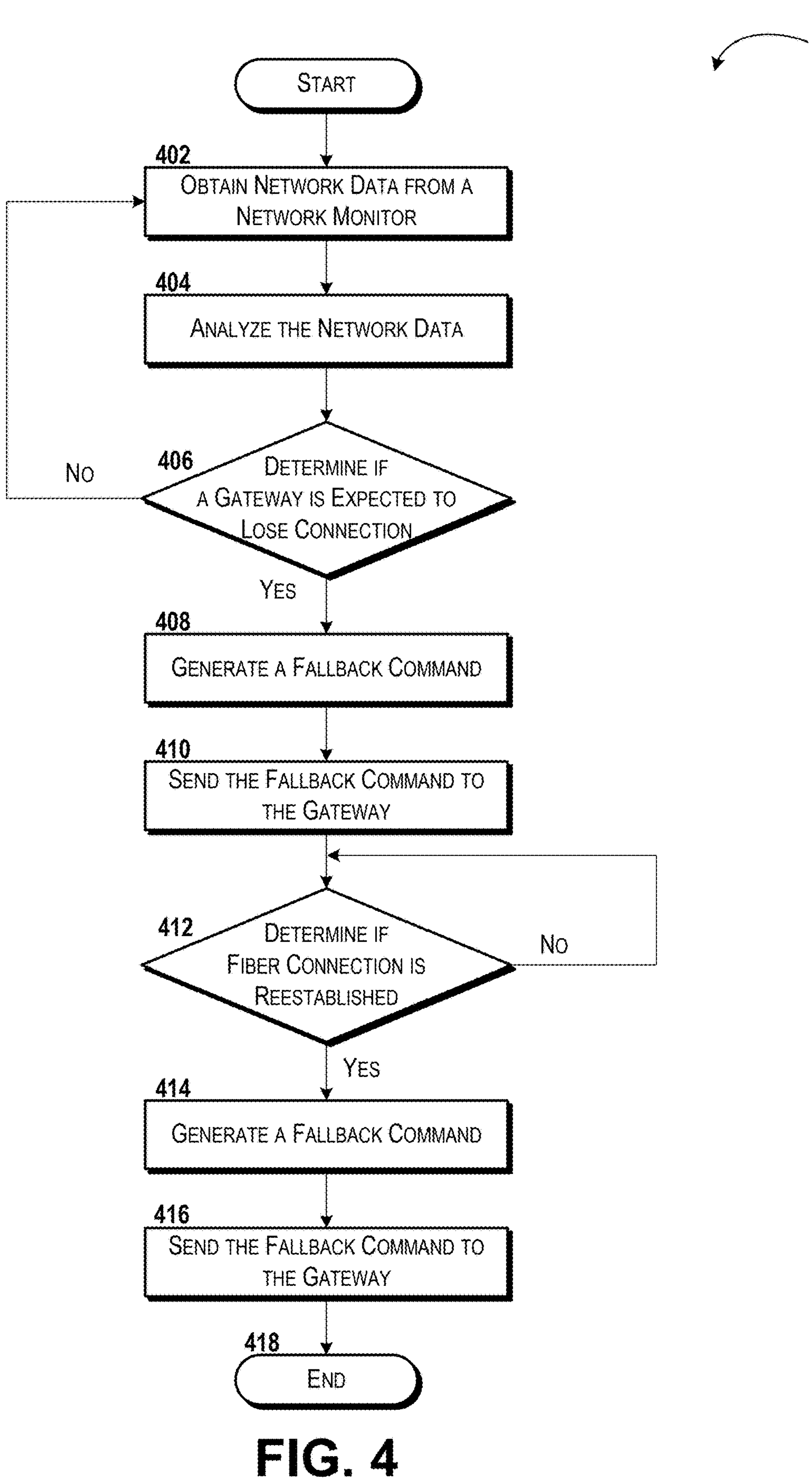
FIG. 4 is a flow diagram showing aspects of a method for monitoring and controlling a gateway having a stackable fallback device, according to an illustrative embodiment of the concepts and technologies described herein.

Turning now to FIG. 4, aspects of a method 400 for monitoring and controlling a gateway having a stackable fallback device will be described in detail, according to an illustrative embodiment. For purposes of illustrating and describing the concepts of the present disclosure, the method 400 is described herein as being performed by the server computer 116 via execution of one or more software modules such as, for example, the connectivity service 114. It should be understood that additional and/or alternative devices and/or network nodes can provide the functionality described herein via execution of one or more modules, applications, and/or other software including, but not limited to, the connectivity service 114. Thus, the illustrated embodiments are illustrative, and should not be viewed as being limiting in any way.

The method 400 begins at operation 402. At operation 402, the server computer 116 can obtain network data 134 from a network monitor 132. The network data 134 can describe, among other things, connections between various devices and the network 104, the fiber network 112, the cellular network 130, and/or other networks and/or entities. Thus, for example, the network data 134 can describe communications between the gateway 102 and the fiber network 112 including, for example, whether such a connection is active or inactive, operating normally or abnormally, communications occurring thereby, combinations thereof, or the like.

According to various embodiments of the concepts and technologies disclosed herein, the network monitor 132 can be configured to release the network data 134 as network data files (e.g., log files, netflow data sets, or the like), or to stream the network data 134 in a continuous stream. In any event, the network data 134 can be communicated to and/or made available to the connectivity service 114. It should be understood that this example embodiment is illustrative, and therefore should not be construed as being limiting in any way.

From operation 402, the method 400 can proceed to operation 404. At operation 404, the server computer 116 can analyze the network data 134. The analysis performed in operation 404 can be performed to determine what connections are active, what connections are inactive, what connections are operating normally, what connections are not operating normally and/or are operating abnormally, and the like. It can be appreciated, therefore, that the network data 134 may represent any number of devices connecting to and/or through the network 104 and therefore may indicate that the gateway 102 is connected to the fiber network 112 while other devices are not connected to the fiber network 112 (or vice versa). Such failures can occur, for example, in a natural disaster, crisis, outage, or the like.

For example, it can be appreciated that as a network outage cascades across a network, an analysis of network data 134 may indicate that devices are losing connectivity with the fiber network 112. Through analysis of the network data 134, the connectivity service 114 can determine where the outage is occurring and/or project where outages will occur in the future. Thus, the analysis of operation 404 can be for detecting past outages, present outages, and/or predicting future outages. It should be understood that this example embodiment is illustrative, and therefore should not be construed as being limiting in any way.

From operation 404, the method 400 can proceed to operation 406. At operation 406, the server computer 116 can determine, based on the analyzed network data 134, if the gateway 102 is expected to lose a connection to the fiber network 112. If the server computer 116 determines, in operation 406, that the gateway 102 is not expected to lose the connection to the fiber network 112, the method 400 can return to operation 402, and the server computer 116 can again obtain network data 134 (or access the stream of network data 134 or the like). Thus, it can be appreciated that operations 402-406 can be iterated until the server computer 116 determines, in any iteration of operation 406, that the gateway 102 is expected to lose the connection to the fiber network 112.

If the server computer 116 determines, in operation 406, that the gateway 102 is expected to lose the connection to the fiber network 112, the method 400 can proceed to operation 408. At operation 408, the server computer 116 can generate a fallback command 136. The fallback command 136 can instruct the gateway 102, the fallback device 122, the user device 118, and/or other devices or entities to relay communications of the gateway 102 through the fallback device 122 instead of the fiber network 112.

From operation 408, the method 400 can proceed to operation 410. At operation 410, the server computer 116 can send the fallback command 136 to the gateway 102 (or other devices or entities such as the user device 118 and/or the fallback device 122). The gateway 102 (or other device that receives the fallback command 136) can cause communications to be routed through and/or to the fallback device 122.

From operation 410, the method 400 can proceed to operation 412. At operation 412, the server computer 116 can determine if the fiber connection of the gateway 102 has been reestablished. As noted above, the connection between the gateway 102 and the fiber network 112 can be monitored (e.g., via analyzing future releases and/or the stream of the network data 134) to determine when the connection is active or inactivate. If the server computer 116 determines, in operation 412, that the fiber connection of the gateway 102 has not been reestablished, the method 400 can repeat operation 412. Thus, performance of the method 400 can be paused at operation 412 until it is determined that the fiber connection of the gateway 102 has been reestablished.

If the server computer 116 determines, in operation 412, that the fiber connection of the gateway 102 has been reestablished, the method 400 can proceed to operation 414. At operation 414, the server computer 116 can generate a fallback command 136. This fallback command 136 generated in operation 414 can cause the recipient (e.g., the gateway 102, the fallback device 122, and/or the user device 118) to again connect to the fiber network 112 (e.g., via the gateway 102). Thus, it can be appreciated that communications can be shifted from the gateway 102 to the fallback device 122 (and the fiber network 112 to the cellular network 130) when the connection between the gateway 102 and the fiber network 112 is lost. Similarly, communications can be shifted back from the fallback device 122 to the gateway 102

(and from the cellular network 130 to the fiber network 112) when the connection between the gateway 102 and the fiber network 112 is reestablished. It should be understood that this example embodiment is illustrative, and therefore should not be construed as being limiting in any way.

From operation 414, the method 400 can proceed to operation 416. At operation 416, the server computer 116 can send the fallback command 136 to the gateway 102 (or other devices or entities such as the user device 118 and/or the fallback device 122). The gateway 102 (or other device that receives the fallback command 136) can cause communications to be routed through the gateway 102 again and not through the fallback device 122. It should be understood that this example embodiment is illustrative, and therefore should not be construed as being limiting in any way.

From operation 416, the method 400 can proceed to operation 418. The method 400 can end at operation 418.

Figure 5:
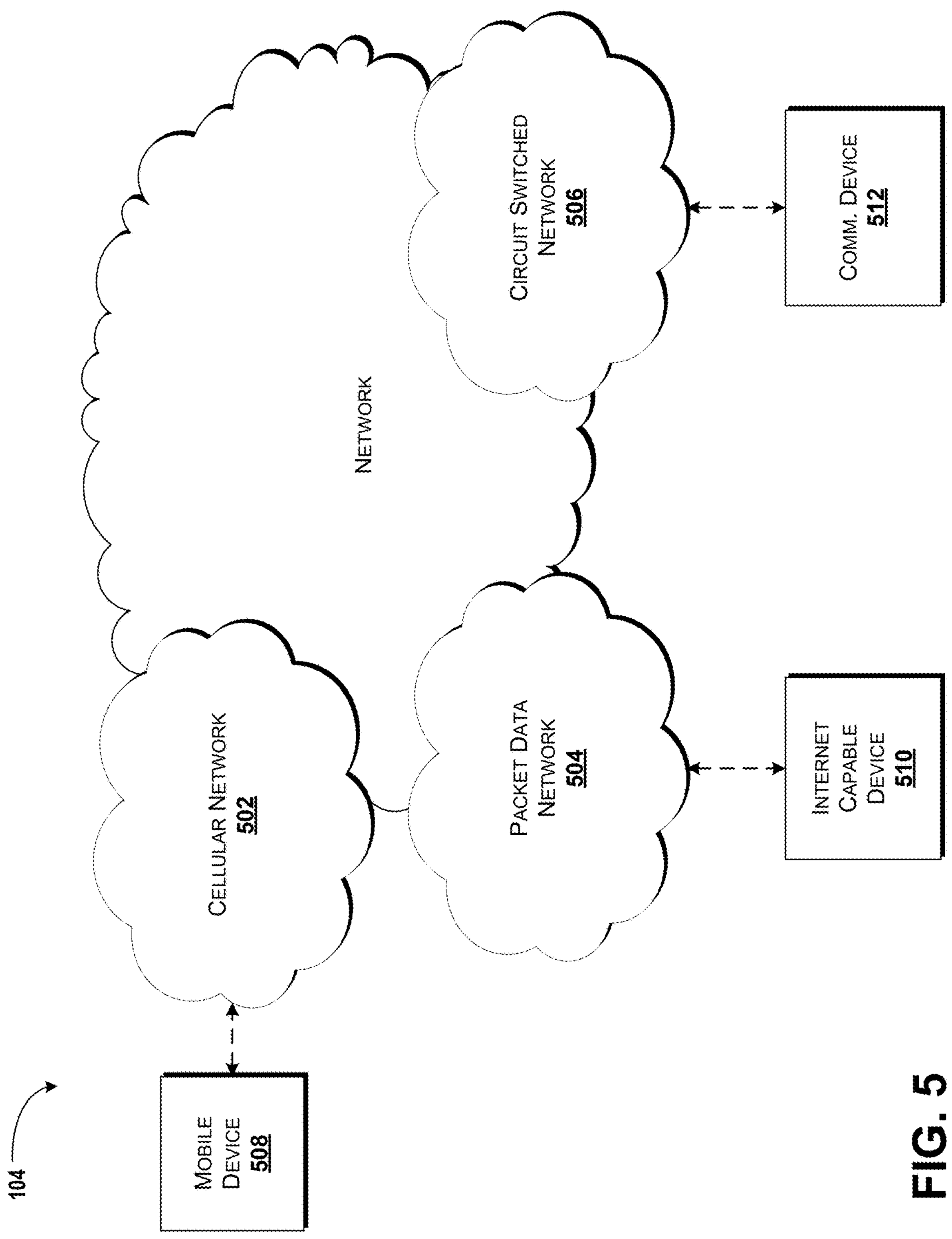
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), NodeB's or eNodeB's ("eNBs"), gNodeBs ("gNBs"), or the like; base station controllers ("BSCs") radio network controllers ("RNCs"), or the like; an evolved packet core ("EPC"); mobile switching centers ("MSCs" or "MSSs"); session management functions ("SMFs); mobile management entities ("MMEs"); access and mobility management functions ("AMFs); authentication server functions ("AUSFs"), network slice selection functions ("NSSFs); network exposure functions ("NEFs"); policy control functions ("PCFs"); and various other functions in the user and control planes such as, for example, user plane functions ("UPFs), application functions ("AFs"), NF repository functions ("NRFs"), and the like; short message service centers ("SMSCs"); multimedia messaging service centers ("MMSCs"); home location registers ("HLRs"); home subscriber servers ("HSSs"); visitor location registers ("VLRs"); charging platforms; billing platforms; voicemail platforms; GPRS core network components; links to data networks ("DNs") and/or other operator services, third party services, and/or the Internet; location service nodes, an IP Multimedia Subsystem ("IMS"); and the like. Of course, the cellular network 502 also can include various interfaces between various components, as is generally understood. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards, 5G mobile communications standards, 6G mobile communication standards, other mobile communications standards, and evolved and future mobile communications standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
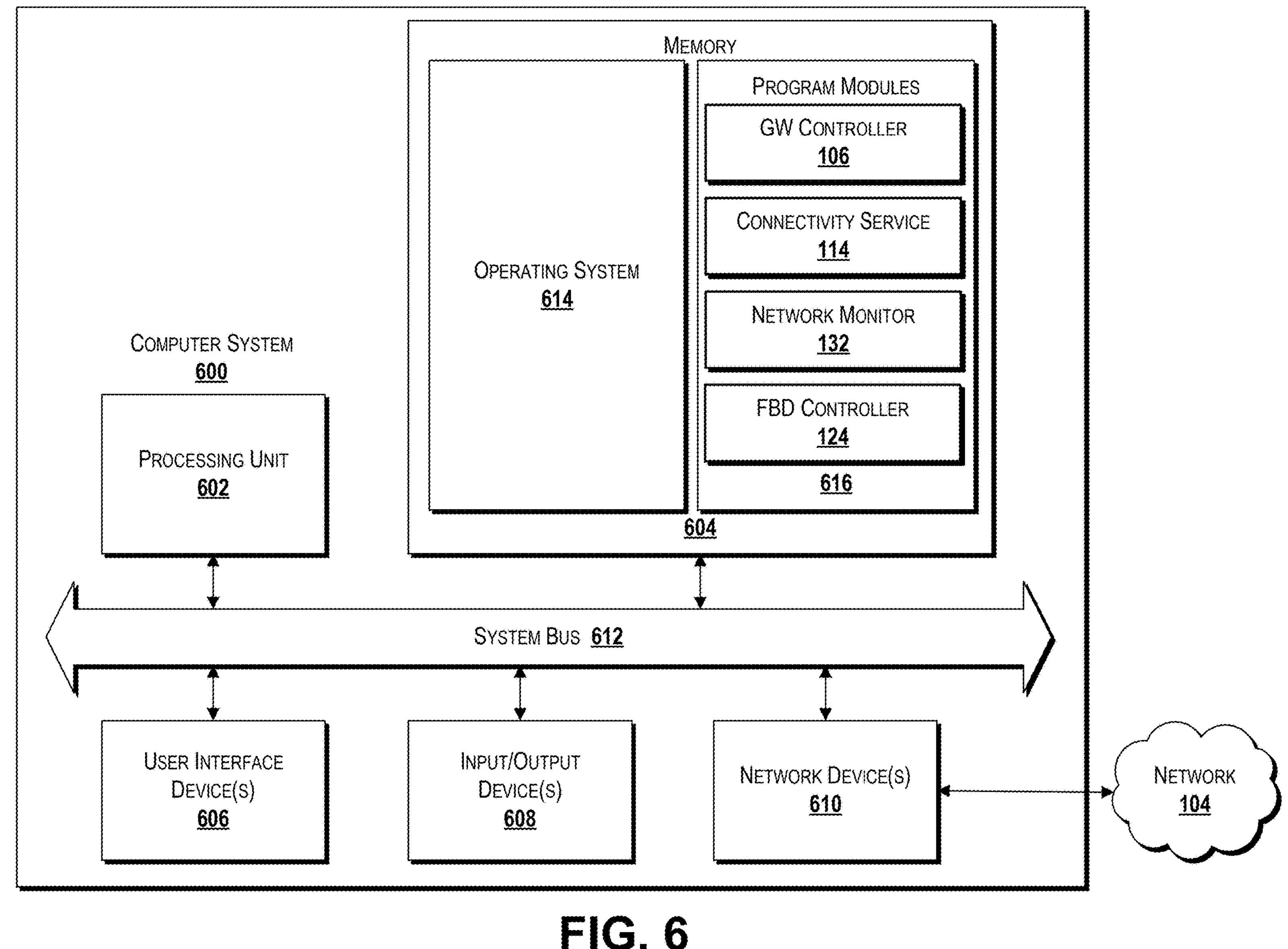
FIG. 6 is a block diagram illustrating an example computer system configured to provide low-cost energy-efficient network-managed and device-managed continuous connectivity, according to some illustrative embodiments of the concepts and technologies described herein.

FIG. 6 is a block diagram illustrating a computer system 600 configured to provide the functionality described herein for providing low-cost energy-efficient network-managed and device-managed continuous connectivity, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The system bus 612 can enable bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or SONOMA families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the gateway controller 106, the connectivity service 114, the network monitor 132, the fallback device controller 124, or the like. These and/or other programs can be embodied in computer-readable media containing instructions that, when executed by the processing unit 602, perform one or more of the methods 200, 300, and 400 described in detail above with respect to FIGS. 2-4 and/or other functionality as illustrated and described herein. It can be appreciated that, at least by virtue of the instructions embodying the methods 200, 300, 400, and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store the network data 134, the fallback command 136, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
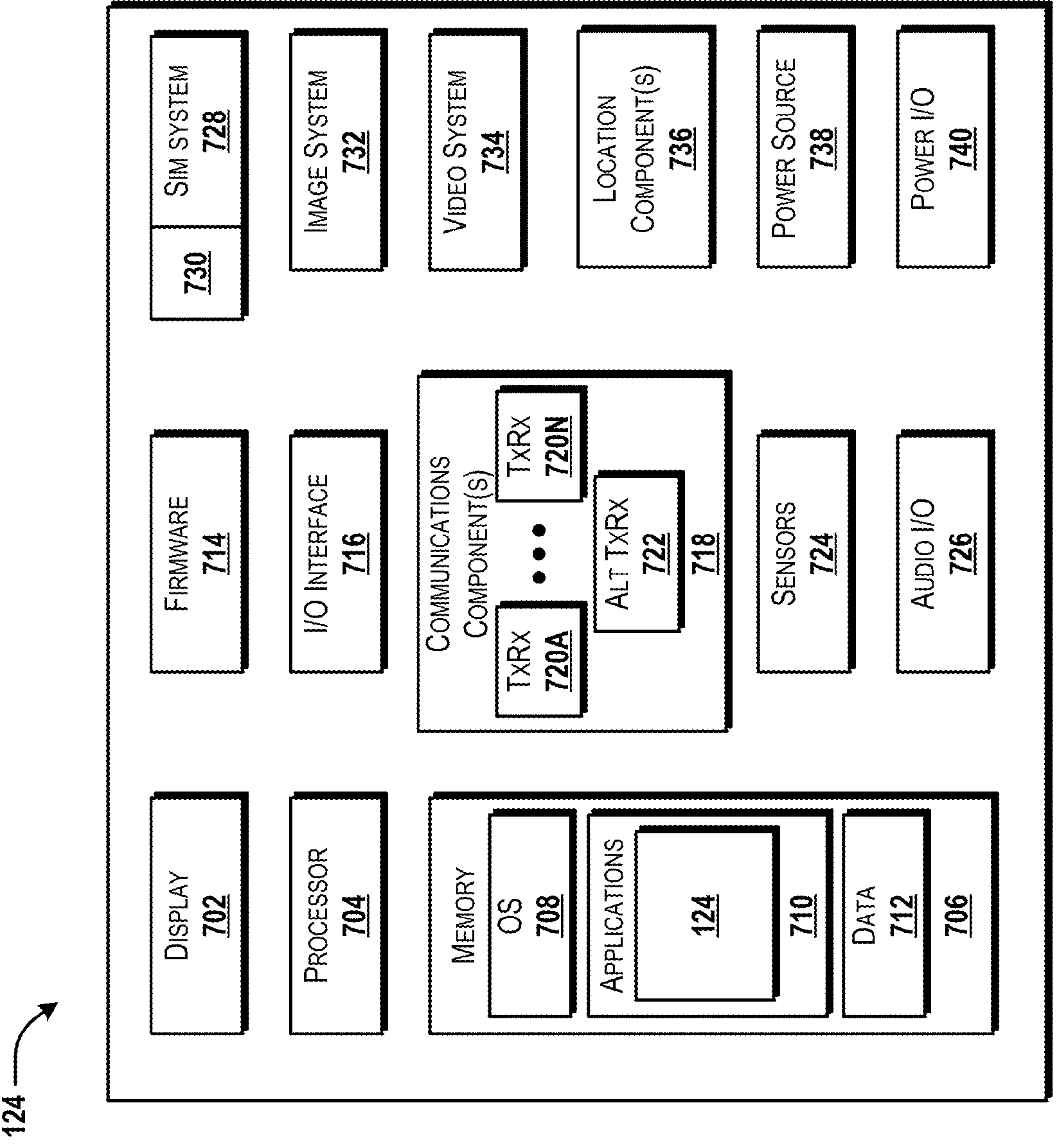
FIG. 7 is a block diagram illustrating an example architecture for a fallback device, according to some illustrative embodiments of the concepts and technologies described herein.

Turning now to FIG. 7, an illustrative architecture for a fallback device 122 and components thereof will be described, according to some embodiments of the concepts and technologies disclosed herein. It should be understood that some embodiments of the fallback device 122 illustrated and described herein may or may not include some or all of the functionality described herein with reference to FIG. 7. While connections are not shown between the various components illustrated in FIG. 7, it should be understood that some, none, or all of the components illustrated in FIG. 7 can be configured to interact with one another to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the fallback device 122 can include a display 702 for displaying data, in some embodiments. According to various embodiments, the display 702 can be configured to display various graphical user interface ("GUI") elements such as, for example, operational state, status of a connection with the cellular network 130, battery status, status of the gateway 102, status of a connection between the gateway 102 and the fiber network 112, virtual keypads and/or keyboards, time, date, calendar data, device preferences, combinations thereof, and/or the like. The fallback device 122 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the fallback device controller 124, other computer-executable instructions stored in a memory 706, or the like. In some embodiments, the applications 710 also can include a UI application (not illustrated in FIG. 7).

The UI application can interface with the operating system 708 to facilitate user interaction with functionality and/or data stored at the fallback device 122 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, selecting network connections, optimizing battery performance, configuring settings, interacting with the fallback device controller 124 and/or other applications 710, and otherwise facilitating user interaction with the operating system 708, the applications 710, and/or other types or instances of data 712 that can be stored at the fallback device 122. The data 712 can include, for example, the fallback device controller 124 and/or other applications or program modules. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704.

It can be appreciated that, at least by virtue of storage of the instructions corresponding to the applications 710 and/or other instructions embodying other functionality illustrated and described herein in the memory 706, and/or by virtue of the instructions corresponding to the applications 710 and/or other instructions embodying other functionality illustrated and described herein being accessed and/or executed by the processor 704, the fallback device 122 is a special-purpose mobile device that can facilitate providing the functionality illustrated and described herein. The firmware 714 also can store code for execution during device power up and power down operations. It can be appreciated that the firmware 714 can be stored in a volatile or non-volatile data storage device including, but not limited to, the memory 706 and/or a portion thereof.

The fallback device 122 also can include an input/output ("I/O") interface 716. The I/O interface 716 can be configured to support the input/output of data such as location information, fallback commands 136, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the fallback device 122 can be configured to synchronize with another device to transfer content to and/or from the fallback device 122. In some embodiments, the fallback device 122 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the fallback device 122 and a network device or local device.

The fallback device 122 also can include a communications component 718. The communications component 718 can be configured to interface with the processor 704 to facilitate wired and/or wireless communications with one or more networks such as the network 104 and/or cellular network 130 illustrated and described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks. In various embodiments, the communications component 718 can include and/or can be the fallback device network adapter 128 illustrated and described herein. It should be understood that this example embodiment is illustrative, and therefore should not be construed as being limiting in any way.

The communications component 718, in some embodiments, can include one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, 5G, 6G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The fallback device 122 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the fallback device 122 may be provided by an audio I/O component 726. The audio I/O component 726 of the fallback device 122 can include one or more speakers for the output of audio signals, one or more microphones for the collection and/or input of audio signals, and/or other audio input and/or output devices.

The illustrated fallback device 122 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the fallback device 122 are contemplated, it should be understood that these embodiments are illustrative, and should not be construed as being limiting in any way.

The fallback device 122 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The fallback device 122 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The fallback device 122 also can include one or more location components 736. The location components 736 can be configured to send and/or receive signals to determine a geographic location of the fallback device 122. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the fallback device 122. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the fallback device 122. Using the location component 736, the fallback device 122 can generate and/or receive data to identify its geographic location, or to transmit data used by other devices to determine the location of the fallback device 122. The location component 736 may include multiple components for determining the location and/or orientation of the fallback device 122.

The illustrated fallback device 122 also can include a power source 738 such as the fallback device power supply 126 illustrated and described herein. The power source 738 can include one or more batteries, power supplies, power cells, and/or other power subsystems including alternating current ("AC") and/or direct current ("DC") power devices. In some embodiments of the concepts and technologies disclosed herein, the fallback device 122 can be inductively charged by the gateway 102 as illustrated and described herein. It should be understood that this example embodiment is illustrative, and therefore should not be construed as being limiting in any way. The power source 738 also can interface with an external power system or charging equipment via a power I/O component 740. Because the fallback device 122 can include additional and/or alternative components, the above embodiment should be understood as being illustrative of one possible operating environment for various embodiments of the concepts and technologies described herein. The described embodiment of the fallback device 122 is illustrative, and should not be construed as being limiting in any way.

Figure 8:
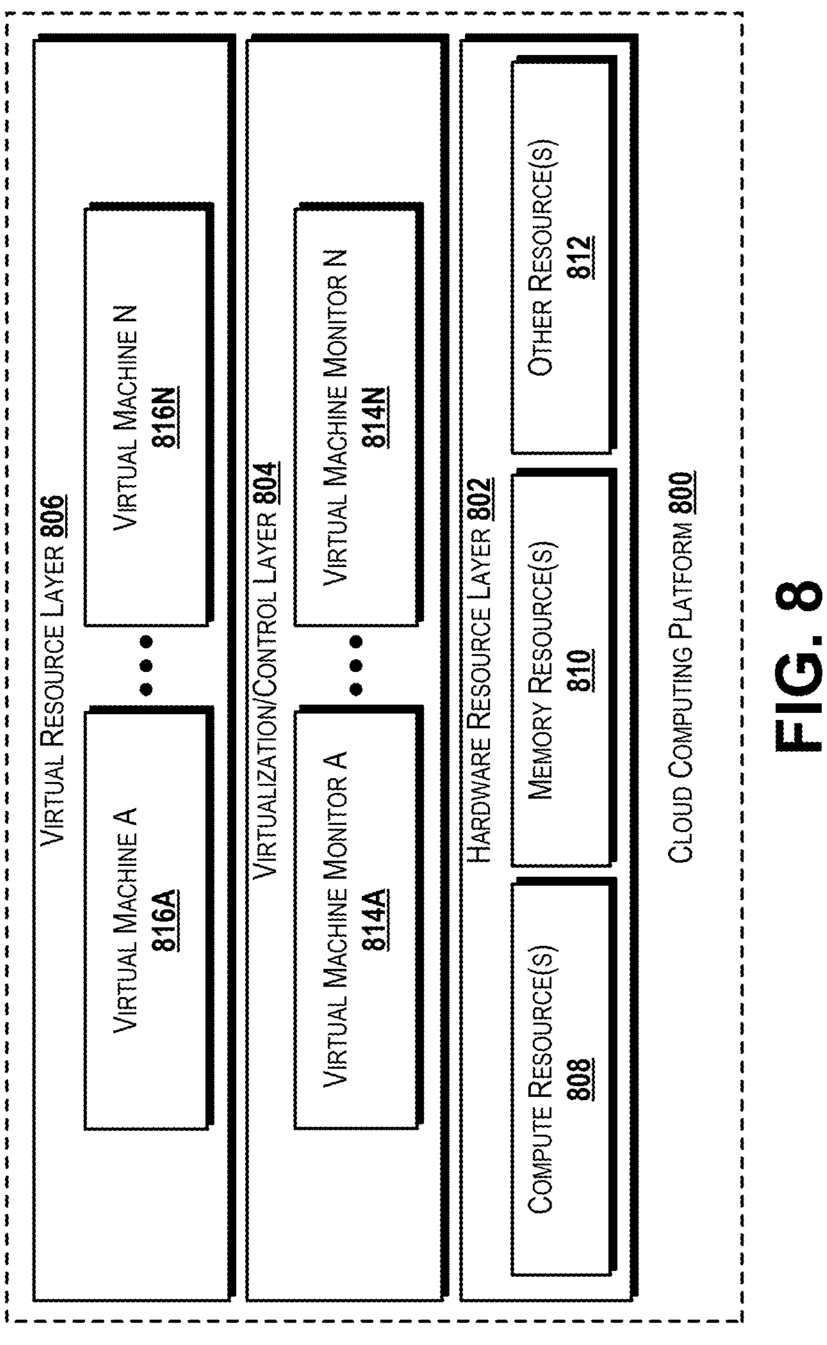
FIG. 8 is a diagram illustrating a computing environment capable of implementing aspects of the concepts and technologies disclosed herein, according to some illustrative embodiments of the concepts and technologies described herein.

FIG. 8 illustrates an illustrative architecture for a cloud computing platform 800 that can be capable of executing the software components described herein for providing low-cost energy-efficient network-managed and device-managed continuous connectivity and/or for interacting with the gateway 102, the user device 118, the fallback device 122, and the like. Thus, it can be appreciated that in some embodiments of the concepts and technologies disclosed herein, the cloud computing platform 800 illustrated in FIG. 8 can be used to provide the functionality described herein with respect to the gateway 102, the server computer 116, the fallback device 122, and/or the network monitor 132.

The cloud computing platform 800 thus may be utilized to execute any aspects of the software components presented herein. Thus, according to various embodiments of the concepts and technologies disclosed herein, the gateway controller 106, the connectivity service 114, and/or the fallback device controller 124 can be implemented, at least in part, on or by elements included in the cloud computing platform 800 illustrated and described herein. Those skilled in the art will appreciate that the illustrated cloud computing platform 800 is a simplification of but only one possible implementation of an illustrative cloud computing platform, and as such, the illustrated cloud computing platform 800 should not be construed as being limiting in any way.

In the illustrated embodiment, the cloud computing platform 800 can include a hardware resource layer 802, a virtualization/control layer 804, and a virtual resource layer 806. These layers and/or other layers can be configured to cooperate with each other and/or other elements of a cloud computing platform 800 to perform operations as will be described in detail herein. While connections are shown between some of the components illustrated in FIG. 8, it should be understood that some, none, or all of the components illustrated in FIG. 8 can be configured to interact with one another to carry out various functions described herein. In some embodiments, the components are arranged so as to communicate via one or more networks such as, for example, the network 104 illustrated and described hereinabove (not shown in FIG. 8). Thus, it should be understood that FIG. 8 and the following description are intended to provide a general understanding of a suitable environment in which various aspects of embodiments can be implemented, and should not be construed as being limiting in any way.

The hardware resource layer 802 can provide hardware resources. In the illustrated embodiment, the hardware resources can include one or more compute resources 808, one or more memory resources 810, and one or more other resources 812. The compute resource(s) 808 can include one or more hardware components that can perform computations to process data, and/or to execute computer-executable instructions of one or more application programs, operating systems, services, and/or other software including, but not limited to, the gateway controller 106, the connectivity service 114, and/or the fallback device controller 124, illustrated and described herein.

According to various embodiments, the compute resources 808 can include one or more central processing units ("CPUs"). The CPUs can be configured with one or more processing cores. In some embodiments, the compute resources 808 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 808 can include one or more discrete GPUs. In some other embodiments, the compute resources 808 can include one or more CPU and/or GPU components that can be configured in accordance with a co-processing CPU/GPU computing model. Thus, it can be appreciated that in some embodiments of the compute resources 808, a sequential part of an application can execute on a CPU and a computationally-intensive part of the application can be accelerated by the GPU. It should be understood that this example is illustrative, and therefore should not be construed as being limiting in any way.

In some embodiments, the compute resources 808 also can include one or more system on a chip ("SoC") components. It should be understood that an SoC component can operate in association with one or more other components as illustrated and described herein, for example, one or more of the memory resources 810 and/or one or more of the other resources 812. In some embodiments in which an SoC component is included, the compute resources 808 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 808 can be or can include one or more hardware components arranged in accordance with an ARM architecture, available for license from ARM HOLDINGS of Cambridge, United Kingdom. Alternatively, the compute resources 808 can be or can include one or more hardware components arranged in accordance with an x86 architecture, such as an architecture available from INTEL CORPORATION of Mountain View, California, and others. Those skilled in the art will appreciate the implementation of the compute resources 808 can utilize various computation architectures and/or processing architectures. As such, the various example embodiments of the compute resources 808 as mentioned hereinabove should not be construed as being limiting in any way. Rather, implementations of embodiments of the concepts and technologies disclosed herein can be implemented using compute resources 808 having any of the particular computation architecture and/or combination of computation architectures mentioned herein as well as other architectures.

Although not separately illustrated in FIG. 8, it should be understood that the compute resources 808 illustrated and described herein can host and/or execute various services, applications, portals, and/or other functionality illustrated and described herein. Thus, the compute resources 808 can host and/or can execute the applications or services illustrated and described herein.

The memory resource(s) 810 can include one or more hardware components that can perform or provide storage operations, including temporary and/or permanent storage operations. In some embodiments, the memory resource(s) 810 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 808, subject to the definition of "computer storage media" provided above (e.g., as excluding waves and signals per se and/or communication media as defined in this application).

Although not illustrated in FIG. 8, it should be understood that the memory resources 810 can host or store the various data illustrated and described herein including, but not limited to, network data 134, the fallback command 136, and/or other data, if desired. It should be understood that this example is illustrative, and therefore should not be construed as being limiting in any way.

The other resource(s) 812 can include any other hardware resources that can be utilized by the compute resources(s) 808 and/or the memory resource(s) 810 to perform operations. The other resource(s) 812 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 802 can be virtualized by one or more virtual machine monitors ("VMMs") 814A-814N (also known as "hypervisors;" hereinafter "VMMs 814"). The VMMs 814 can operate within the virtualization/control layer 804 to manage one or more virtual resources that can reside in the virtual resource layer 806. The VMMs 814 can be or can include software, firmware, and/or hardware that alone or in combination with other software, firmware, and/or hardware, can manage one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816A-816N (hereinafter "VMs 816").

Based on the foregoing, it should be appreciated that systems, devices, and methods for providing low-cost energy-efficient network-managed and device-managed continuous connectivity have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:

a processor; and a memory that stores computer-executable instructions that, when executed by the processor, cause the processor to perform operations comprising establishing, with a gateway, wireless communications, wherein the gateway communicates via a connection with a fiber network;

monitoring the connection with the fiber network to determine if the connection with the fiber network has been lost by the gateway;

if a determination is made that the connection with the fiber network has been lost by the gateway, activating, at a fallback device, a cellular connection with a cellular network and relaying communications from the gateway to the cellular network;

monitoring the connection with the fiber network to determine if the connection with the fiber network has been reestablished by the gateway; and if a determination is made that the connection with the fiber network has been reestablished by the gateway, terminating, by the fallback device, the cellular connection, thereby causing the communications from the gateway to be directed to the fiber network.

2. The system of claim 1, wherein the wireless communications are conducted via WiFi between the gateway and the fallback device.

3. The system of claim 1, wherein monitoring the connection with the fiber network comprises obtaining, from a connectivity service, data that indicates a status of the connection with the fiber network.

4. The system of claim 3, wherein the connectivity service obtains network data from a network monitor to determine the status of the connection with the fiber network.

5. The system of claim 1, wherein the fallback device comprises a reduced capability device having a cellular transceiver, and wherein relaying the communications from the gateway to the cellular network comprises receiving, from the gateway and via the wireless communications, the communications and sending the communications to the cellular network.

6. The system of claim 1, wherein the fallback device connects to the gateway via physical connectors, and wherein the fallback device comprises a rechargeable battery that is charged via a power supply of the gateway.

7. The system of claim 6, wherein the fallback device comprises a stackable reduced capability device, and wherein the fallback device is inductively charged by the gateway.

8. A method comprising:

establishing, by a fallback device comprising a processor and with a gateway, wireless communications, wherein the gateway communicates via a connection with a fiber network;

monitoring, by the fallback device, the connection with the fiber network to determine if the connection with the fiber network has been lost by the gateway;

if a determination is made that the connection with the fiber network has been lost by the gateway, activating, by the fallback device and at the fallback device, a cellular connection with a cellular network and relaying communications from the gateway to the cellular network;

monitoring, by the fallback device, the connection with the fiber network to determine if the connection with the fiber network has been reestablished by the gateway; and if a determination is made that the connection with the fiber network has been reestablished by the gateway, terminating, by the fallback device, the cellular connection, thereby causing the communications from the gateway to be directed to the fiber network.

9. The method of claim 8, wherein the wireless communications are conducted via WiFi between the gateway and the fallback device.

10. The method of claim 8, wherein monitoring the connection with the fiber network comprises obtaining, from a connectivity service, data that indicates a status of the connection with the fiber network.

11. The method of claim 10, wherein the connectivity service obtains network data from a network monitor to determine the status of the connection with the fiber network.

12. The method of claim 8, wherein the fallback device comprises a reduced capability device having a cellular transceiver, and wherein relaying the communications from the gateway to the cellular network comprises receiving, from the gateway and via the wireless communications, the communications and sending the communications to the cellular network.

13. The method of claim 8, wherein the fallback device connects to the gateway via physical connectors, and wherein the fallback device comprises a rechargeable battery that is charged via a power supply of the gateway.

14. The method of claim 13, wherein the fallback device comprises a stackable reduced capability device, and wherein the fallback device is inductively charged by the gateway.

15. A computer storage medium having computer-executable instructions stored thereon that, when executed by a processor, cause the processor to perform operations comprising:

establishing, with a gateway, wireless communications, wherein the gateway communicates via a connection with a fiber network;

monitoring the connection with the fiber network to determine if the connection with the fiber network has been lost by the gateway;

if a determination is made that the connection with the fiber network has been lost by the gateway, activating, at a fallback device, a cellular connection with a cellular network and relaying communications from the gateway to the cellular network;

monitoring the connection with the fiber network to determine if the connection with the fiber network has been reestablished by the gateway; and if a determination is made that the connection with the fiber network has been reestablished by the gateway, terminating, by the fallback device, the cellular connection, thereby causing the communications from the gateway to be directed to the fiber network.

16. The computer storage medium of claim 15, wherein the wireless communications are conducted via WiFi between the gateway and the fallback device.

17. The computer storage medium of claim 15, wherein monitoring the connection with the fiber network comprises obtaining, from a connectivity service, data that indicates a status of the connection with the fiber network.

18. The computer storage medium of claim 15, wherein the fallback device comprises a reduced capability device having a cellular transceiver, and wherein relaying the communications from the gateway to the cellular network comprises receiving, from the gateway and via the wireless communications, the communications and sending the communications to the cellular network.

19. The computer storage medium of claim 15, wherein the fallback device connects to the gateway via physical connectors, and wherein the fallback device comprises a rechargeable battery that is charged via a power supply of the gateway.

20. The computer storage medium of claim 19, wherein the fallback device comprises a stackable reduced capability device, and wherein the fallback device is inductively charged by the gateway.

* * * * *